A. M. ALLEN.
PNEUMATIC TIRE.
APPLICATION FILED AUG. 28, 1914.
1,134,660.
Patented Apr. 6, 1915.
2 SHEETS—SHEET 1.
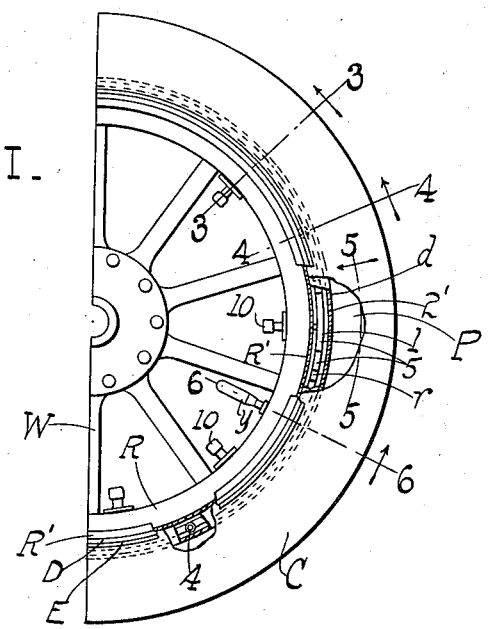
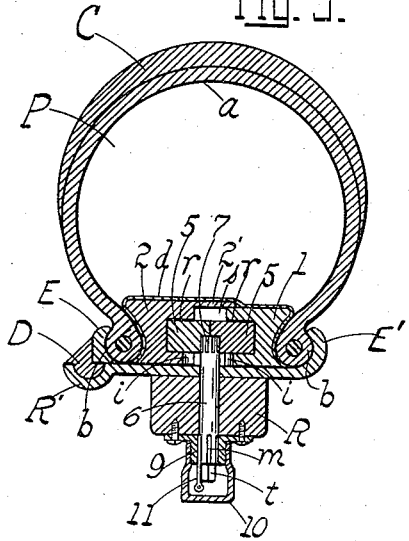
WITNESSES:
Harry A. Beinne
Josamichy
INVENTOR.
Albert M. Allen.
BY Emil Starek
ATTORNEY.

A. M. ALLEN.
PNEUMATIC TIRE.
APPLICATION FILED AUG. 28, 1914.
1,134,660.
Patented Apr. 6, 1915.
2 SHEETS—SHEET 2.
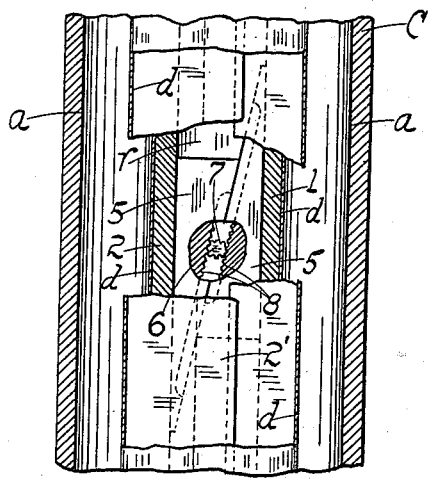
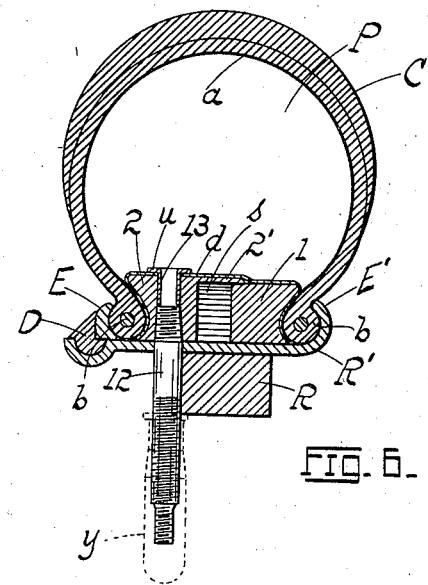
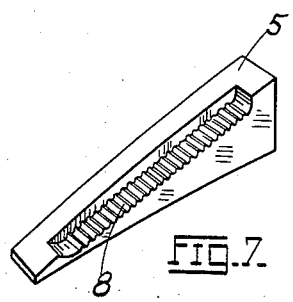
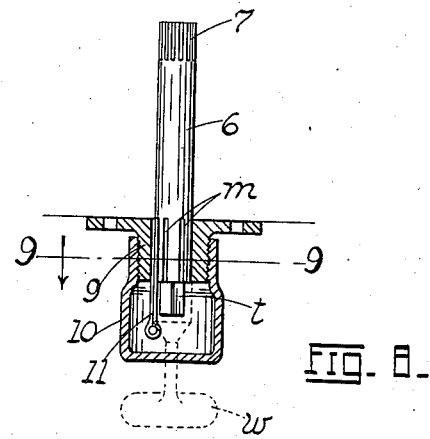
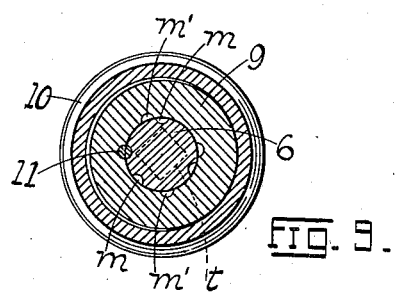
WITNESSES:
Harry A. Bennet
Jos. Arrichef
INVENTOR.
Albert M. Allen
BY Emil Searey
ATTORNEY.

UNITED STATES PATENT OFFICE.

ALBERT M. ALLEN, OF ST. LOUIS, MISSOURI.

PNEUMATIC TIRE.

1,134,660.    Specification of Letters Patent.    Patented Apr. 6, 1915.

Application filed August 28, 1914. Serial No. 859,100.

*To all whom it may concern:*

Be it known that I, ALBERT M. ALLEN, a citizen of the United States, residing at St. Louis, State of Missouri, have invented certain new and useful Improvements in Pneumatic Tires, of which the following is a full, clear, and exact description, reference being had to the accompanying drawings, forming a part hereof.

My invention has relation to improvements in pneumatic tires; and it consists in the novel features of construction more fully set forth in the specification and pointed out in the claims.

In the drawings, Figure 1 is a side elevation of one-half of a vehicle-wheel, with parts broken away, showing my invention applied thereto; Fig. 2 is an edge view of the wheel; Fig. 3 is an enlarged cross-section on the line 3—3 of Fig. 1; Fig. 4 is an enlarged cross-section on the line 4—4 of Fig. 1; Fig. 5 is an enlarged cross-sectional detail on the curved line 5—5 of Fig. 1 with parts broken away; Fig. 6 is an enlarged cross-section on the line 6—6 of Fig. 1; Fig. 7 is a perspective of one of the locking wedges or quoins which control the rings about which the outer casing is secured; Fig. 8 is an enlarged view on the order of Fig. 3, showing the cap-piece which protects the stem or key which actuates the quoins; and Fig. 9 is a cross-section on the line 9—9 of Fig. 8.

The main object of the present invention is to dispense with the inner inflatable sack or tube of pneumatic tires, it being well known that one of the serious objections to such a tube is the deterioration which the tube suffers from the heat resulting from the friction between it and the outer casing. The consequence is that the inflatable rubber member rots and soon disintegrates and must be discarded. In lieu of the inflatable tube I provide an outer casing with an inner lining of rubber cured to the casing, making special provision for securing such a casing to the rim of the wheel and making the same air tight. By eliminating the inner tube, I do away with crimps, pinches and valve-leaks, and other disadvantages, as will be fully apparent from a detailed description of the invention which follows:

Referring to the drawings, W represents a conventional automobile wheel, R the felly thereof, R′, the felly-band, C the open tire-casing, D the outer detachable ring, E the removable locking flange and E′ the permanent flange for the casing, all as fully understood in the art, and here shown more or less conventionally. In the present embodiment of my invention I provide the casing C with an inner rubber lining *a* cured to the casing wall, said lining extending over the inner faces of the beads *b* forming the edges or margins of the casing, the outer faces of the beads as well understood, being engaged by the flanges E, E′, above referred to. Spanning the distance between the beads *b*, *b*, of the casing C, and cemented or otherwise secured air-tight to the inner lining *a* of the casing, is a web of rubber *d*, the marginal portions or sides of which engage the lining *a* the full extent of the inner faces of the beads *b*, *b*. This web together with the lining *a* of the casing forms an air-tight annular chamber P about the rim of the wheel, and is an admirable substitute for the prevailing inner inflatable tube of the conventional pneumatic tire.

The web *d* is supported at points between the beads *b*, *b*, by a pair of steel locking rings or strips, 1, 2, loosely enveloping the felly band R′, the rings being adjustable to and from one another (that is to say, across the plane of rotation of the wheel,) the ring 2 being provided with an inner ledge 2′ overlapping the outer face of the ring 1 and thus spanning the gap or annular space *s* between the rings when the rings are forced apart against their respective beads *b*, for the purpose of clamping the casing to the wheel. The ledge 2′ thus insures for the web *d* at all times, a substantially continuous support, irrespective of the width of the gap *s*. As best seen in Figs. 3 and 4, the outer sides of the rings 1, 2, are contoured to conform to the curvature of the inner walls of the beads *b*, whereby, when the rings are driven against the beads, the latter are firmly clamped between the rings and the flanges E, E′.

Disposed along the inner sides of the rings 1, 2, and positioned opposite one another, are pockets or depressions *e*, *e*, into the bottoms of which are driven eye-bolts 3, 3, to which are secured the opposite ends of a contracting spring 4, the tendency of the spring being to draw the rings 1, 2, toward one another, and away from the casing-beads *b*, *b*. In practice four pairs of pockets *e*, *e*, that is to say, four springs 4, distributed about the periphery of the wheel is sufficient to satisfactorily operate the rings, although I do not wish to be restricted to any particular number of springs.

To force the rings 1, 2, apart, when occasion arises to clamp or lock the casing to the rim, I make the following provision: Disposed at intervals across the annular gap $s$ between the locking rings are pairs of quoins or right-angled wedges 5, 5, said wedges being mounted in suitable grooves or recesses $r$ formed in said rings behind the ledge 2′. The lengths of the recesses measured around the periphery of the wheel are of course sufficient to allow for the maximum play or movement to which the wedges are subjected in practice. The bases of the wedges engage the bases of the recesses $r$ of the rings; the ends of the wedges, that is to say, the triangular faces of the wedges engage the inner and outer side walls of the recess (the said faces and walls being curved to conform to the curvature of the periphery of the wheel as shown in Figs. 1 and 7), the backs of the wedges tending in opposite directions as obvious (Fig. 5). The inclined faces of the wedges of course play freely over one another, the wedges being actuated simultaneously in opposite directions (in planes parallel to the plane of rotation of the wheel) to "expand" or "contract" the wedges, by means of a rotatable stem 6 operating radially through the felly R and band R′ and extending into the space $s$, the inner end of the stem being provided with a toothed formation or pinion 7 meshing with the toothed or rack formations 8 on the wedges, or quoins 5, said formation 8 being depressed below the plane of the inclined face of the wedge, and of a width equal to substantially the available width of said inclined face (Figs. 3, 7). As shown in Fig. 7, the length of the toothed portion 8 is somewhat less than the length of the wedge, so that the full width of the inclined faces of the respective wedges may engage one another at points beyond the ends of the toothed portions. The outer terminal of the actuating stem 6 is provided with a series of longitudinal peripheral grooves $m$, said grooved portion operating through a hollow boss or bearing 9 secured to the inner face of the felly R, the periphery of the boss being screw-threaded to receive a cap-piece 10 by which the stem may be protected. The outer end of the stem terminates in a reduced portion or polygonal head $t$ to which a socket wrench or key $w$ may be applied and the stem turned upon removal of the screw-cap 10. The grooves $m$ coöperate with a series of similar grooves $m'$ on the walls of the bore of the boss 9, and when two of the grooves $m$, $m'$, are brought into register, a split locking pin or cotter 11 may be inserted into the resulting hole or passage, thus serving to lock the stem against accidental rotation from the position to which it has been turned. The cap 10 likewise protects the pin 11 as clearly obvious from the drawings.

It was stated at the outset that I eliminate valve-leaks by the present invention. This is due to the specific manner of securing the check-valve casing 12 to the ring 2. In the present instance the air or check-valve (that is, the casing 12 thereof) is screwed into the ring 2 through the felly-band R′ alongside the felly R, the valve partially entering the ring and being driven until it meets the adjacent end of the hollow rubber bushing or thimble 13 whose inner end is flanged over the rubber web or sheet $d$, the flange $u$ being cemented to said web. The air valve is provided with the usual removable dust cap $y$ as well understood in the art. The bushing 13 makes a tight fit with the walls of the opening in the ring 2 into which it is inserted, so that no air can leak between it and the walls of said opening and behind the web $d$. Thus the web $d$ and the inner rubber lined wall of the casing C form an air tight chamber P which may be filled with compressed air, and the same perform the function of the usual inner inflated tube and outer casing so well known in the art. The free edge of the overhang or ledge 2′ tapers to an edge (Fig. 4) the bevel thus formed serving to readily peel the web $d$ from the supporting surface of the ring 1, with any movement of the rings 1, 2, toward one another, thus avoiding wrinkling or pinching of the web, and the latter will always lie flat on the rings 1, 2, and across the ledge 2′ when the rings are separated (Fig. 4) so there is no danger of deterioration of the web from this source.

To lock the casing C with its web $d$ to the wheel, the operator first turns the stems 6 in proper direction to cause each stem to drive its wedges toward each other, that is to say, to contract the wedges or cause the backs of each pair of wedges to separate from one another. This contraction of the wedges permits the several springs 4 to draw the rings 1, 2, toward one another, and away from the flanges E, E′. The beads $b$, $b$, of the casing are now inserted between the outer concaved side faces of the rings and the flanges E, E′, respectively, the connecting web $d$ being deposited over the outer or peripheral surfaces of the rings and across the ledge 2′, whereupon the operator turns the several stems 6 in the opposite direction, this having the effect of expanding or driving apart the members of each pair of wedges or quoins, and thus driving apart the rings 1, 2. These in turn drive the beads $b$, $b$, against the flanges E, E′, the beads being thus gripped or locked between the rings and flanges aforesaid. The casing thus mounted may now be filled with compressed air as described, and the pneumatic tire is thus completed. To remove the tire the stems 6 are again rotated in proper direction to release the rings from the beads $b, b,$ when the beads may be freely withdrawn from between the rings and the members E, E'. When the casing is inflated (that is to say, filled with compressed air or gas), and the rings 1, 2, are forced apart the necessary distance to lock the tire to the wheel (Fig. 4), the web $d$ lies flat across the rings, and there is no danger of wrinkles to start deterioration of the web. It will thus be apparent that the advantages enumerated for the invention are present in the tire here illustrated.

For purposes of the present invention, the parts R', D, E, taken together, may be regarded as the rim of the wheel.

I do not of course limit myself to the use of two rings 1, 2; as I may use only one; neither do I limit myself to the specific number of wedges or quoins here illustrated.

In driving the rings 1, 2, against the casing beads $b$, the members E, E', operate as stationary supports or abutments for the beads, engaging the latter from one side, while the movable rings engage the beads from the opposite side.

When the rings 1, 2, are drawn fully together, the gap $s$ of course will disappear; but to allow the rings the full play whereby the gap may disappear, it is necessary to form a recess $i$ in each ring on opposite sides of the stem 6 (Fig. 3), the two recesses forming, upon a meeting of the rings, a passage-way for the stem. Were it not for the recesses, the stem 6 would prevent the rings from being drawn together the full width of the gap $s$, and thus interfere in a measure with the removal of the beads $b$ from their anchorage between the rings and the abutments E, E'. By allowing the rings to come together a sufficient space is formed between each ring and its corresponding abutment to allow for a free withdrawal of the beads, and a ready removal of the casing C.

Having described my invention, what I claim is:

1. In combination with a wheel having a rim, an open casing having edges securable to the wheel, a web connecting the edges, a pair of movable rings enveloping the rim and supporting the web aforesaid, abutments on the rim for engaging the casing walls from one side, and means for forcing the rings against the opposite sides of the casing walls and the latter against the abutments whereby the casing becomes locked to the wheel.

2. In combination with a wheel rim, a pair of spring-controlled rings loosely enveloping the same and adjustable to and from one another across the plane of rotation of the wheel, means interposed between the rings for driving the same apart, the springs tending to draw them together, an open casing having its edges interposed between a stationary support on the rim and one side of a ring, a web connecting the edges of the casing and spanning the rings, means on the rings affording the web a substantially continuous support for the web, and means for maintaining the rings in their outwardly driven position whereby the casing becomes gripped between the rings and the stationary supports aforesaid.

3. In combination with a wheel having a rim, abutments on each side of the rim, a pair of rings encompassing the rim between the abutments, said rings being adjustable to and from one another across the plane of rotation of the wheel, a ledge on one of the rings overlapping the outer surface of the opposite ring and forming a substantially continuous supporting surface, an open casing having marginal beads insertible between the respective abutments and their adjacent rings, a web connecting the margins of the casing and spanning the rings and the ledge aforesaid, contracting springs disposed at intervals between the rings for drawing the rings away from the abutments, and means controllable from a point outside the rim for forcing the rings toward the abutments, and thereby locking the casing to the wheel.

4. In combination with a wheel having a rim, flange abutments on each side of the rim, a pair of rings encompassing the rim between the abutments and adjustable to and from one another between the abutments, means for forming a permanent continuous surface between the peripheries of the rings, an open casing having its margins inserted between the rings and their respective abutments, a web connecting the margins of the casing and spanning the rings and supported at all points by the continuous surface formation aforesaid, springs interposed between and connected to the rings for drawing the rings together, pairs of wedges interposed between the rings for forcing the rings apart, a rotatable stem passed through the rim for actuating the wedges, and means for locking the stem against rotation, and the wedges against movement for any adjusted position of the wedges.

5. In combination with a wheel and rim thereof, a pair of rings enveloping the rim, pairs of wedges interposed between and mounted on the rings, rack surfaces being formed on the wedges, a rotatable stem on the rim terminating in a toothed formation engaging said rack surfaces, longitudinal peripheral grooves being disposed on the outer terminal of said stem, a hollow member traversed by said grooved portion of the stem and provided with corresponding grooves on its inner surface disposed opposite the path of rotation of the grooves on the stem, and a locking pin insertible into a groove of the stem and of the hollow member when two of the grooves are brought into register, for the purpose set forth.

6. In combination with a wheel and rim thereof, a pair of rings encompassing the rim, grooves in the rings disposed along the inner adjacent faces of the rings, quoins in the grooves operating in pairs, sockets formed in the rings at points beyond the grooves, springs in the pockets connecting the rings, and means for spanning the gap between the rings, for the purpose set forth.

In testimony whereof I affix my signature, in presence of two witnesses.

ALBERT M. ALLEN.

Witnesses:
EMIL STAREK,
JOS. A. MICHEL.